US007005663B2

(12) United States Patent
Maolinbay et al.

(10) Patent No.: US 7,005,663 B2
(45) Date of Patent: Feb. 28, 2006

(54) SAMPLING METHODS AND SYSTEMS THAT SHORTEN READOUT TIME AND REDUCE LAG IN AMORPHOUS SILICON FLAT PANEL X-RAY DETECTORS

(75) Inventors: Manat Maolinbay, Sunnyvale, CA (US); Paul Granfors, Sunnyvale, CA (US); Richard Aufrichtig, Mountain View, CA (US); Richard Cronce, New Berlin, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 207 days.

(21) Appl. No.: 10/646,107

(22) Filed: Aug. 22, 2003

(65) Prior Publication Data

US 2005/0040352 A1 Feb. 24, 2005

(51) Int. Cl.
*G03B 42/08* (2006.01)
*G01T 1/105* (2006.01)
(52) U.S. Cl. .................................. 250/584; 358/213.27
(58) Field of Classification Search ................ 250/584, 250/208.1, 370.11, 370.09; 358/213.27, 358/213.29; 348/308
See application file for complete search history.

(56) References Cited

U.S. PATENT DOCUMENTS

| 4,996,413 A | 2/1991 | McDaniel et al. |
| 5,812,191 A * | 9/1998 | Orava et al. ................ 348/308 |
| 6,353,654 B1 | 3/2002 | Granfors et al. |
| 2002/0085667 A1 | 7/2002 | Miller |

\* cited by examiner

*Primary Examiner*—Otilia Gabor
(74) *Attorney, Agent, or Firm*—Dougherty Clements; Christopher L. Bernard; Peter J. Vogel

(57) ABSTRACT

Sampling methods and systems that shorten readout time and reduce lag in amorphous silicon flat panel x-ray detectors are described. Embodiments comprise: (a) activating a reset switch to discharge any residual signal being held in a feedback capacitor; (b) deactivating the reset switch; (c) activating a field effect transistor; (d) sampling an electrical signal from the amorphous silicon flat panel x-ray detector, while the field effect transistor is activated; (e) activating a reset switch, after the electrical signal has been sampled and while the field effect transistor is still activated, to discharge any residual signal being held in the feedback capacitor; (f) deactivating the field effect transistor, while the reset switch is still activated; (g) deactivating the reset switch; and (h) repeating steps (c)–(g) as necessary to obtain a predetermined radiographic image.

18 Claims, 4 Drawing Sheets

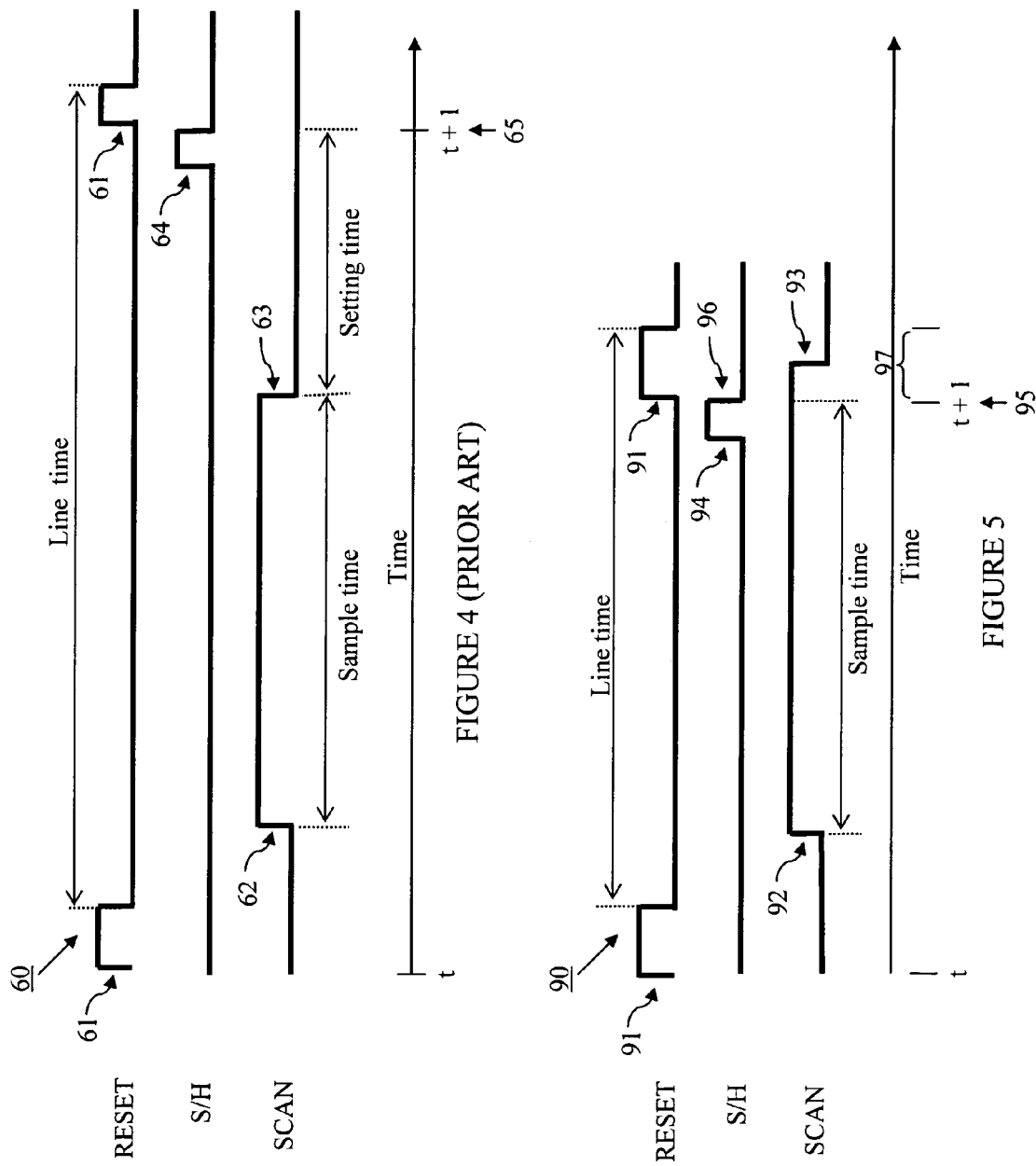

SAMPLING METHODS AND SYSTEMS THAT SHORTEN READOUT TIME AND REDUCE LAG IN AMORPHOUS SILICON FLAT PANEL X-RAY DETECTORS

FIELD OF THE INVENTION

The present invention relates generally to medical imaging systems. More specifically, the present invention relates to amorphous silicon flat panel x-ray detectors. Even more specifically, the present invention relates to sampling methods that shorten readout time and reduce lag in amorphous silicon flat panel x-ray detectors.

BACKGROUND OF THE INVENTION

As medicine continues to progress, new advanced medical imaging technologies are being developed. With applications ranging from diagnostic procedures to radiation therapy, the importance of high-performance medical imaging is immeasurable. Some high-performance medical imaging systems allow dynamic imaging (i.e., imaging of moving events or scenes). However, these imaging systems must be able to image at high frame rates (i.e., $\geq 30$ frames/second). Some such imaging systems utilize amorphous silicon flat panel x-ray detectors.

Generally, in amorphous silicon flat panel x-ray detectors, an amorphous silicon array is disposed on a glass substrate, and a scintillator is disposed over the amorphous silicon array. The scintillator converts x-ray photons to visible light, and then the amorphous silicon array converts the light into electrical charge. The charge at each pixel on the amorphous silicon array is then read out digitally by low-noise electronics, and is sent to an image processor. Thereafter, the image is displayed on a display, and may also be stored in memory for later retrieval.

The amorphous silicon array comprises field effect transistors (FETs) and photodiodes, typically arranged in rows and columns, wherein the FETs act as switches to control the charging of the photodiodes. The source of each FET is connected to a photodiode, and the drain of each FET is connected to readout electronics via data lines or contact leads.

Current amorphous silicon flat panel x-ray detectors experience certain electrical phenomena that cause imaging difficulties—memory effect and lag effect. Due to the imperfect nature of amorphous silicon FETs, once the FET is turned off, the charge is retained temporarily in the FET, which is known as the memory effect. This transient retained charge bleeds out, or decays, over time, which corrupts the signal being sent to the image processor. Therefore, generally a certain amount of settling time is necessary once a FET is turned off, before signal sampling can occur. As this settling time can take up a significant portion of the total available readout time (i.e., in some cases, it can take up to ⅓ of the total available readout time), reducing or eliminating this settling time will free up more time for signal sampling and/or shorten the line time. Reducing the line time is key to achieving desirable high frame rate imaging (i.e., more than 30 frames/second).

Lag is another undesirable property that exists in current amorphous silicon flat panel displays. The lag effect is caused by residual signals that are left over from the previous image frames, which can cause "ghost images" in imaging techniques such as fluoroscopy. Generally, this lag effect is managed by complex and cumbersome software correction schemes. Therefore, it would be desirable to be able to reduce the lag via a simple and robust means inside the detector hardware instead.

Since existing amorphous silicon flat panel x-ray detectors have imaging limitations, it would be desirable to have amorphous silicon flat panel x-ray detectors that lacked those restrictions. Specifically, it would be desirable to have amorphous silicon flat panel x-ray detectors that utilize sampling methods that shorten readout time and reduce lag therein.

SUMMARY OF THE INVENTION

Accordingly, the above-identified shortcomings of existing amorphous silicon flat panel x-ray detectors, and methods for signal sampling associated therewith, are overcome by embodiments of the present invention. The amorphous silicon flat panel x-ray detectors and signal sampling methods of this invention shorten readout time and reduce lag, without requiring complex computer schemes to do so.

Embodiments of this invention comprise sampling methods and systems for shortening readout time and reducing lag in amorphous silicon flat panel x-ray detectors. These methods and systems comprise: (a) activating a reset switch to discharge any residual signal being held in a feedback capacitor; (b) deactivating the reset switch; (c) activating a field effect transistor; (d) sampling an electrical signal from the amorphous silicon flat panel x-ray detector, while the field effect transistor is activated; (e) activating a reset switch, after the electrical signal has been sampled and while the field effect transistor is still activated, to discharge any residual signal being held in the feedback capacitor; (f) deactivating the field effect transistor, while the reset switch is still activated; (g) deactivating the reset switch; and (h) repeating steps (c)–(g) as necessary to obtain a predetermined radiographic image.

In embodiments, the electrical signal is sampled while the field effect transistor is activated in a manner that eliminates the need for FET-off settling time before sampling. In embodiments, the field effect transistor is deactivated while the reset switch is activated in a manner that reduces lag, as compared to the lag in conventional amorphous silicon flat panel x-ray detectors. These sampling methods allow frame rates in excess of 30 frames per second to be achieved, and they require less line time than conventional amorphous silicon flat panel x-ray detector sampling methods.

This invention also comprises sampling methods and systems for shortening readout time and reducing lag in amorphous silicon flat panel x-ray detectors. These methods and systems comprise: obtaining an electrical sample during a FET-on period, switching to a FET-off period after the electrical sample is obtained, and allowing a RESET-on period to overlap both the FET-on period and the FET-off period for a predetermined period of time.

In embodiments, the electrical signal is sampled during the FET-on period so that there is no need for the FET-off period before obtaining the electrical sample. In embodiments, the FET-off period begins during the RESET-on period to reduce lag, as compared to the lag in conventional amorphous silicon flat panel x-ray detectors. These sampling methods allow frame rates in excess of 30 frames per second to be achieved, and they require less line time than conventional amorphous silicon flat panel x-ray detector sampling methods.

Further features, aspects and advantages of the present invention will be more readily apparent to those skilled in the art during the course of the following description, wherein references are made to the accompanying figures which illustrate some preferred forms of the present invention, and wherein like characters of reference designate like parts throughout the drawings.

DESCRIPTION OF THE DRAWINGS

The systems and methods of the present invention are described herein below with reference to various figures, in which:

FIG. 4 is a timing diagram showing the timing of a conventional sampling scheme; and FIG. 5 is a timing drawing showing the timing of the sampling scheme utilized in embodiments of this invention.

DETAILED DESCRIPTION OF THE INVENTION

For the purposes of promoting an understanding of the invention, reference will now be made to some preferred embodiments of the present invention as illustrated in FIGS. 1–5 and specific language used to describe the same. The terminology used herein is for the purpose of description, not limitation. Specific structural and functional details disclosed herein are not to be interpreted as limiting, but merely as a basis for the claims as a representative basis for teaching one skilled in the art to variously employ the present invention. Any modifications or variations in the depicted support structures and methods, and such further applications of the principles of the invention as illustrated herein, as would normally occur to one skilled in the art, are considered to be within the spirit of this invention.

This invention relates to sampling methods that shorten readout time and reduce lag in amorphous silicon flat panel x-ray detectors. This invention utilizes a new readout method, wherein the sample is taken during the FET-on period, and the FET-off switching occurs after the sample is obtained, thereby shortening the readout time. Additionally, there is a relatively short period of time where both the FET-on and FET-off states overlap with the RESET-on time period, thereby reducing the lag commonly exhibited in many amorphous silicon flat panel x-ray detectors.

Figure 1:
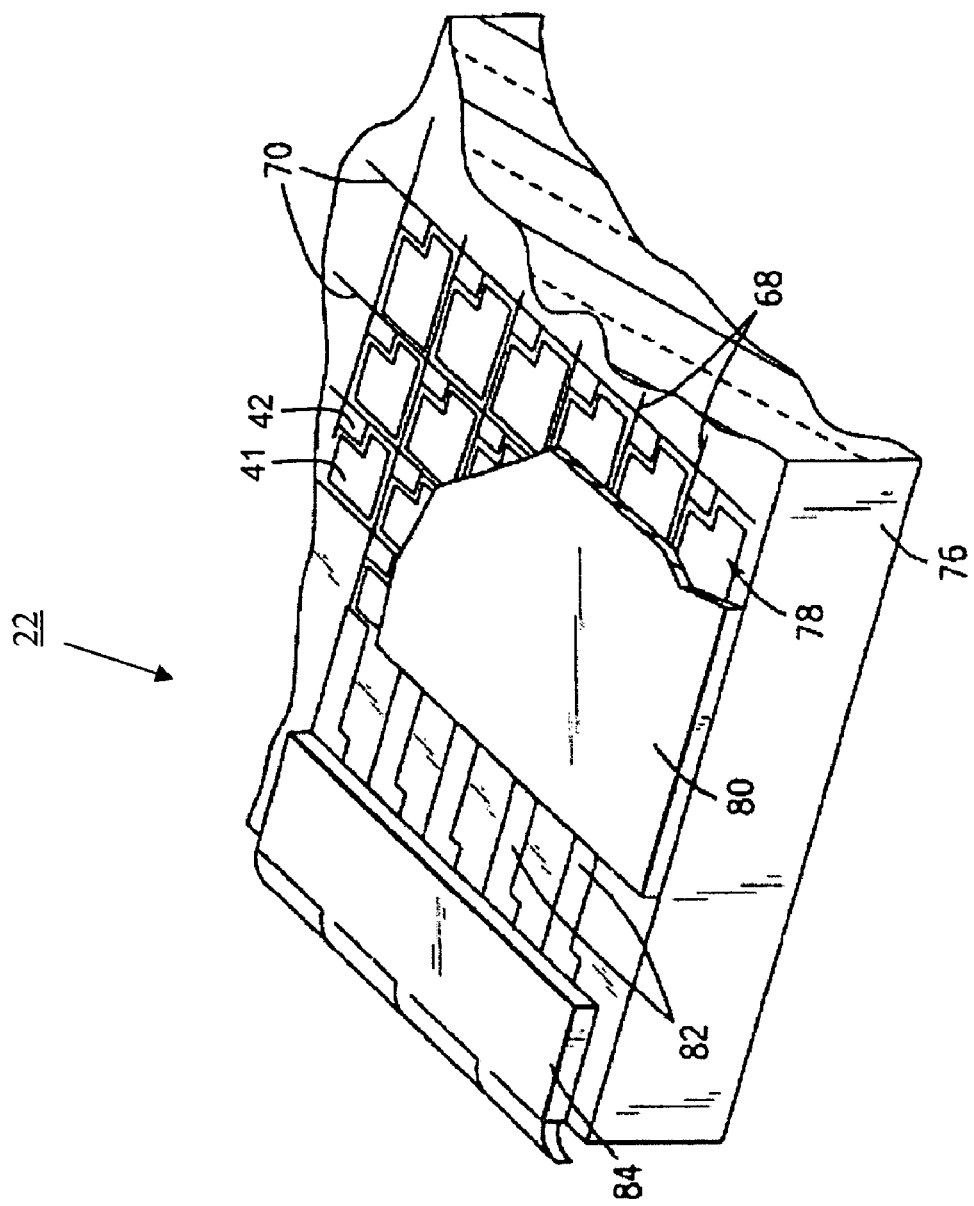
FIG. 1 is a schematic diagram showing the components of a single piece amorphous silicon flat panel, as utilized in embodiments of this invention.

Referring now to FIG. 1, there is shown an exemplary amorphous silicon flat panel x-ray detector 22, as utilized in embodiments of this invention. Generally, column electrodes 68 and row electrodes 70 are disposed on a single piece glass substrate 76, and an amorphous silicon array 78 is defined thereby. The amorphous silicon array 78 comprises an array of photodiodes 41 and field effect transistors (FETs) 42. A scintillator 80 is disposed over the amorphous silicon array 78. The scintillator 80, which may comprise a dose-efficient cesium iodide scintillator, receives x-ray radiation during operation, and converts the x-ray photons therein to visible light. The high fill factor amorphous silicon array 78, wherein each photodiode therein represents a pixel, converts the light into an electrical charge. The charge at each pixel is then read out digitally by low-noise electronics (via contact fingers 82 and contact leads 84), and is sent to an image processor 28.

Figure 2:
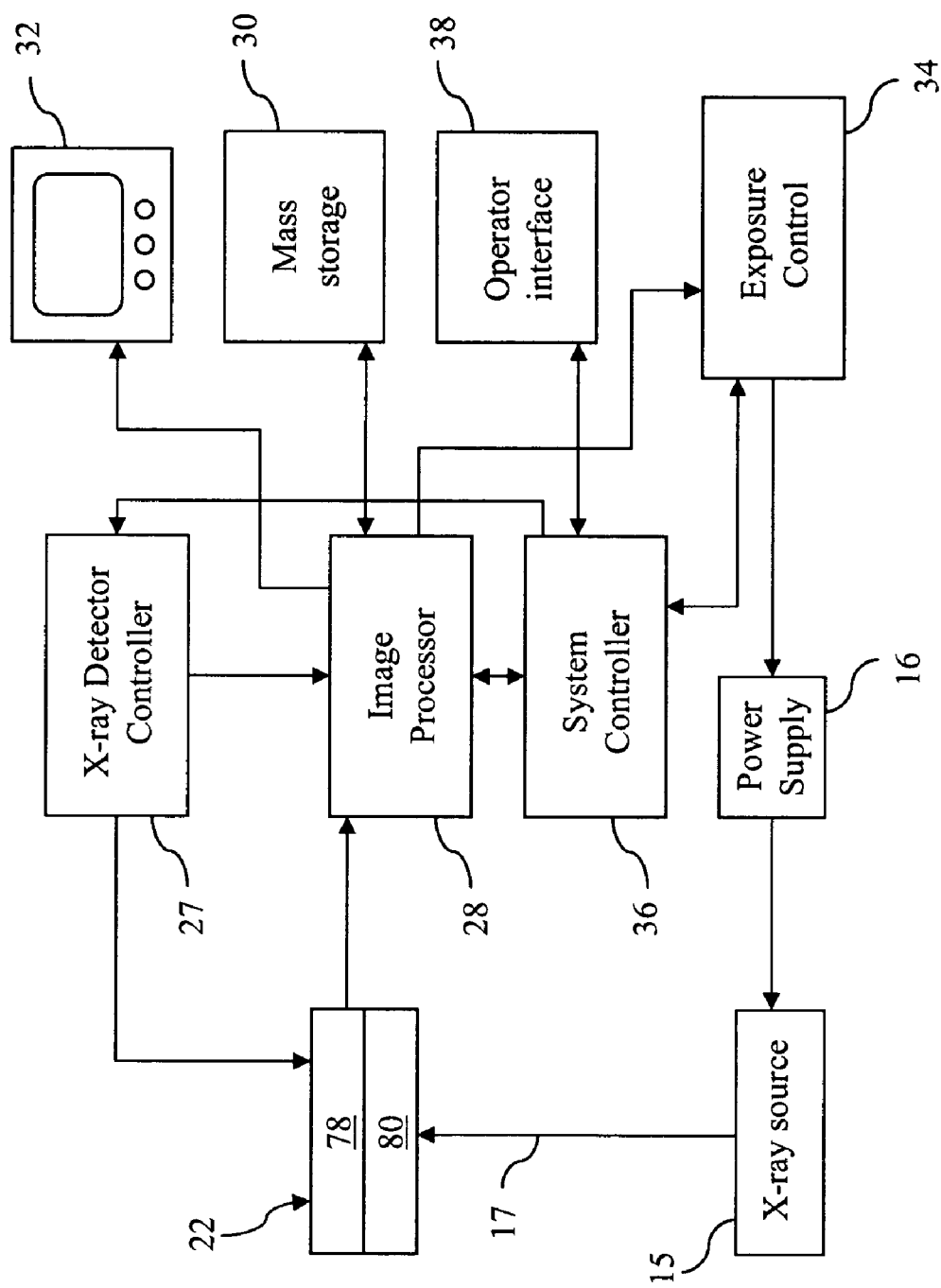
FIG. 2 is a schematic diagram showing the architecture of an x-ray system, as utilized in embodiments of this invention.

Referring now to FIG. 2, there is shown a schematic diagram showing the architecture of an x-ray system, as utilized in embodiments of this invention. The x-ray system generally comprises an x-ray source 15 and an x-ray detector 22, and an x-ray detector controller 27 that contains electronics for operating the detector 22. During operation, x-rays 17 are directed from the x-ray source 15 towards the x-ray detector 22, which comprises a scintillator 80 and an amorphous silicon array 78 (which comprises photodiodes 41 and field effect transistors (FETs) 42). After passing through an object being imaged (i.e., a patient), the x-rays 17 fall upon scintillator 80, which converts the x-ray photons therein to visible light. The visible light is then converted to an electrical charge by the array of photodiodes 41. Each photodiode 41 is of large enough area to ensure it will intercept a sizeable portion of the visible light produced by the scintillator. Each photodiode 41 also has a relatively large capacitance that allows it to store the electrical charge that results from the photon excitation. The electrical charge is then sent to an image processor 28, where the image signal is processed and enhanced. The processed image may then be displayed on a cathode ray tube display 32, or other suitable display, and/or the image can be stored in mass storage 30 for later retrieval. The image processor 28 also produces a brightness control signal which is applied to an exposure control circuit 34 to regulate the power supply 16, which thereby regulates the x-ray source 15. The overall operation of the x-ray system is governed by a system controller 36, which may receive commands from operator interface 38. Operator interface 38 may comprise a keyboard, touchpad, or other suitable input device. An associated cathode ray tube display 32 (or other suitable display) may allow the operator to view the reconstructed image and other data from the image processor 28. The operator supplied commands and parameters may be used by the system controller 36 to provide control signals and information to the image processor 28, the x-ray detector controller 27, and/or the exposure control circuit 34.

Embodiments of the present invention may make use of software or firmware running on the system controller 36 to carry out the processing of data in the methods and systems of this invention. A mouse or pointing device may be employed to facilitate the entry of data and/or image locations. Other embodiments of this invention may utilize a general purpose computer or workstation having a memory and/or printing capability for storing or printing images. Suitable memory devices are well known and include, but are not limited to, RAM, diskettes, hard drives and optical media.

Figure 3:
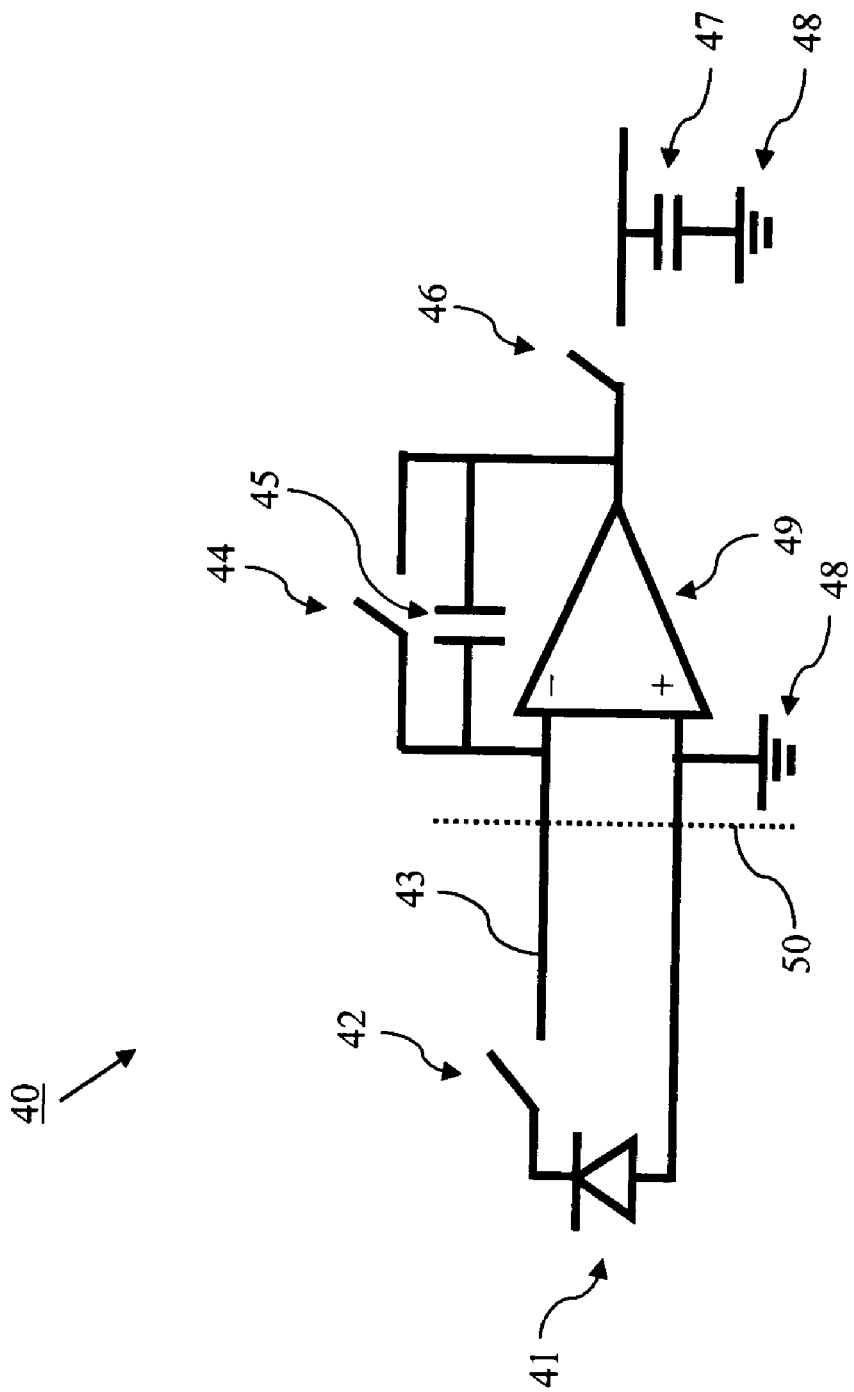
FIG. 3 is a simplified equivalent circuit diagram showing the pixel and readout electronics utilized in embodiments of this invention.

Referring now to FIG. 3, there is shown a simplified equivalent circuit diagram 40 showing the pixel and readout electronics utilized in embodiments of this invention. As shown herein, a pixel is represented by a photodiode 41 and a scan switch 42 (which is actually a FET), where 50 represents the boundary between the panel and the electronics behind the panel. A data line 43 connects each pixel to the circuitry in the readout circuit. The readout circuit comprises an operational amplifier charge integrator 49, followed by a sample and hold circuit 46. Generally, a readout cycle starts with a reset pulse generated by briefly closing reset switch 44, which discharges the signal in the feedback capacitor 45 that is left from the previous readout cycle. Then, the pixel signal is integrated to the feedback capacitor 45 during the FET-on period (i.e., when scan switch 42 is closed). After the FET is switched off (i.e., after the scan switch 42 is open), the integrator output is sampled to the sample capacitor 47. This is essentially a full cycle sampling method, since the sample is taken after a full FET on/off cycle. The final signal that is stored in the feedback capacitor 45 includes the pixel charge, as well as the FET-on and FET-off transient charges, which capacitively couple to the data from the gate electrode of the FET. Because the FET-on and FET-off transient charges are equal in magnitude, but opposite in polarity, they cancel each other out in the final signal, which results in a very narrow offset dispersion. This circuit also comprises two grounds 48.

In this full cycle sampling method, once the FET is turned off (i.e., when scan switch 42 is opened), a charge is temporarily retained in the FET. This transient retained charge bleeds out, or decays, over time, which corrupts the signal being sent to the image processor. Therefore, a certain amount of settling time is necessary before signal sampling can occur. As this settling time can take up a significant portion of the total available readout time (i.e., in some cases, it can take up to ⅓ of the total available readout time), reducing or eliminating this settling time will free up more time for signal sampling and/or shorten the line time. Reducing the line time is key to achieving desirable high frame rate imaging (i.e., more than 30 frames/second).

Referring now to FIG. 4, there is shown a timing diagram showing the timing of a conventional sampling scheme 60. Generally, in existing amorphous silicon flat panel x-ray detectors, a readout cycle is begun by closing the reset switch 61 to discharge any signal that may be left in the feedback capacitor 45 from the previous readout cycle. Thereafter, sampling/scanning is generally done for about 20 $\mu$sec (i.e., by closing the scan switch 62 so that the FET is on for about 20 $\mu$sec). Thereafter, about 10–20 $\mu$sec of settling time is required (i.e., the scan switch is opened 63 so that the FET is off for about 10–20 $\mu$sec). Then, just before a signal is sampled, the sample and hold switch is closed 64 to allow current to flow to the sample capacitor 47. Once a signal sample is obtained 65 at time=t+1, then the reset switch may be closed again 61 to discharge the signal in the feedback capacitor 45 before beginning another readout cycle. Then, the same cycle just described would be repeated.

Referring now to FIG. 5, there is shown a timing drawing showing the timing of the novel sampling scheme utilized in embodiments of this invention. In this invention, a readout cycle is begun by closing the reset switch 91 to discharge any signal that may be left in the feedback capacitor 45 from the previous readout cycle. Thereafter, sampling/scanning is generally done for about 20 $\mu$sec (i.e., by closing the scan switch 92 so that the FET is on for about 20 $\mu$sec). In this invention, there is no settling time required, and the FET-on transient charge is not cancelled before sampling. Just before a signal is sampled, and while the FET is still on 92, the sample and hold switch is closed 94 to allow current to flow to the sample capacitor 47. As soon as the sample and hold switch is opened again 96, the signal is sampled 95 while the FET is still on at time=t+1. Just after a signal sample is obtained 95, then the reset switch may be closed again 91 to discharge the signal in the feedback capacitor 45 before beginning another readout cycle. Shortly thereafter, and while the reset switch is still closed, the scan switch can be opened again 93 so that the FET is off. Then, the same cycle as just described would be repeated. Thereafter, sampling/scanning is generally done for about 20 $\mu$sec (i.e., by closing the scan switch 92 so that the FET is on for about 20 $\mu$sec). In this invention, there is no settling time required, and the FET-on transient charge is not cancelled before sampling. Just before a signal is sampled, and while the FET is still on 92, the sample and hold switch is closed 94 to allow current to flow to the sample capacitor 47. As soon as the sample and hold switch is opened again 96, the signal is sampled 95 while the FET is still on at time=t+1. Just after a signal sample is obtained 95, then the reset switch may be closed again 91 to discharge the signal in the feedback capacitor 45 before beginning another readout cycle. Shortly thereafter, and while the reset switch is still closed, the scan switch can be opened again 93 so that the FET is off. Then, the same cycle as just described would be repeated.

As shown herein in FIG. 5, in the sampling scheme of the present invention, there is a small time period when both the FET-on 92 and FET-off 93 overlap 97 with the reset switch being closed 91. By doing this, the necessity for the FET-off settling time has been eliminated. Additionally, switching the FET to off 93 while the reset switch is closed 91 significantly reduces the lag as compared to the sampling scheme shown in FIG. 4. Furthermore, the line time required for the conventional sampling schemes (FIG. 4) is much longer than the line time required for the sampling schemes of the present invention (FIG. 5). Therefore, the sampling schemes of the present invention make it possible to image at higher frame rates (i.e., in excess of 30 frames/second).

As shown in FIGS. 4 and 5, this invention shortens the readout time and reduces the lag as compared to conventional amorphous silicon flat panel x-ray detectors. In this invention, the pixel signal is integrated to the feedback capacitor 45 during the FET-on period 92, which is the same as in the full cycle sampling method shown in FIG. 4. However, in this invention, the sampling 95 takes place while the FET is still on 92, and FET-off switching 93 happens only after the sample has been obtained. This is essentially a half cycle sampling method, as opposed to the full cycle sampling method shown in FIG. 4. In this invention, the final signal that is stored in the feedback capacitor 45 includes the pixel charge and the FET-on transient charge, but excludes the FET-off transient charge. As the settling time is no longer needed in this invention, the line time that is required for obtaining signal samples is significantly shorter than conventional methods required.

As described above, this invention allows shorter readout times to be obtained than is currently possible with existing amorphous silicon flat panel x-ray detector systems and methods. Additionally, lag is reduced by this invention. Advantageously, only minor modifications, if any, to existing amorphous silicon flat panel x-ray detector systems and methods are needed to practice this invention, thereby making this solution particularly attractive. There is no readily apparent solution that offers the same benefits and simplicity as the present invention. Many other advantages will also be apparent to those skilled in the relevant art.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. The techniques of this invention may be performed in numerous different ways without varying from the spirit and scope of this invention, and all such variations are intended to be covered herein. Thus, it is intended that the present invention cover all suitable modifications and variations as come within the scope of the appended claims and their equivalents.

What is claimed is:

1. A sampling method for shortening readout time and reducing lag in amorphous silicon flat panel x-ray detectors, the method comprising the steps:
   (a) activating a reset switch to discharge any residual signal being held in a feedback capacitor;
   (b) deactivating the reset switch;
   (c) activating a field effect transistor;
   (d) sampling an electrical signal from the amorphous silicon flat panel x-ray detector, while the field effect transistor is activated;
   (e) activating a reset switch, after the electrical signal has been sampled and while the field effect transistor is still activated, to discharge any residual signal being held in the feedback capacitor;
   (f) deactivating the field effect transistor, while the reset switch is still activated;
   (g) deactivating the reset switch; and
   (h) repeating steps (c)–(g) as necessary to obtain a predetermined radiographic image.

2. The sampling method of claim 1, wherein the electrical signal is sampled while the field effect transistor is activated, thereby eliminating the need for FET-off settling time before sampling.

3. The sampling method of claim 1, wherein the field effect transistor is deactivated while the reset switch is activated, thereby reducing lag, as compared to the lag in conventional amorphous silicon flat panel x-ray detectors.

4. The sampling method of claim 1, wherein the frame rate is in excess of 30 frames per second.

5. The sampling method of claim 1, wherein the sampling time is less that $1/30^{th}$ of a second per frame.

6. A system for shortening readout time and reducing lag in amorphous silicon flat panel x-ray detectors, the system comprising:
   (a) a means for activating a reset switch to discharge any residual signal being held in a feedback capacitor;
   (b) a means for deactivating the reset switch;
   (c) a means for activating a field effect transistor;
   (d) a means for sampling an electrical signal from the amorphous silicon flat panel x-ray detector, while the field effect transistor is activated;
   (e) a means for activating a reset switch, after the electrical signal has been sampled and while the field effect transistor is still activated, to discharge any residual signal being held in the feedback capacitor;
   (f) a means for deactivating the field effect transistor, while the reset switch is still activated;
   (g) a means for deactivating the reset switch; and
   (h) a means for repeating steps (c)–(g) as necessary to obtain a predetermined radiographic image.

7. The system of claim 6, wherein the electrical signal is sampled while the field effect transistor is activated, thereby eliminating the need for FET-off settling time before sampling.

8. The system of claim 6, wherein the field effect transistor is deactivated while the reset switch is activated, thereby reducing lag, as compared to the lag in conventional amorphous silicon flat panel x-ray detectors.

9. The system of claim 6, wherein the frame rate is in excess of 30 frames per second.

10. A sampling method for shortening readout time and reducing lag in amorphous silicon flat panel x-ray detectors, the method comprising: obtaining an electrical sample during a FET-on period, switching to a FET-off period after the electrical sample is obtained, and allowing a RESET-on period to overlap both the FET-on period and the FET-off period for a predetermined period of time.

11. The sampling method of claim 10, wherein the electrical signal is sampled during the FET-on period so that there is no need for the FET-off period before obtaining the electrical sample.

12. The sampling method of claim 10, wherein the FET-off period begins during the RESET-on period to control lag.

13. The sampling method of claim 10, wherein the frame rate is in excess of 30 frames per second.

14. The sampling method of claim 10, wherein the sampling time is less that $1/30^{th}$ of a second per frame.

15. A system for shortening readout time and reducing lag in amorphous silicon flat panel x-ray detectors, the system comprising: a means for obtaining an electrical sample during a FET-on period, a means for switching to a FET-off period after the electrical sample is obtained, and a means for allowing a RESET-on period to overlap both the FET-on period and the FET-off period for a predetermined period of time.

16. The system of claim 15, wherein the electrical signal is sampled during the FET-on period so that there is no need for the FET-off period before obtaining the electrical sample.

17. The system of claim 15, wherein the FET-off period begins during the RESET-on period to control lag.

18. The system of claim 15, wherein the frame rate is in excess of 30 frames per second.

* * * * *